J. L. COUTTS.
DEVICE FOR TRANSMITTING POWER.
APPLICATION FILED SEPT. 21, 1917.
1,282,678.
Patented Oct. 22, 1918.
2 SHEETS—SHEET 1.
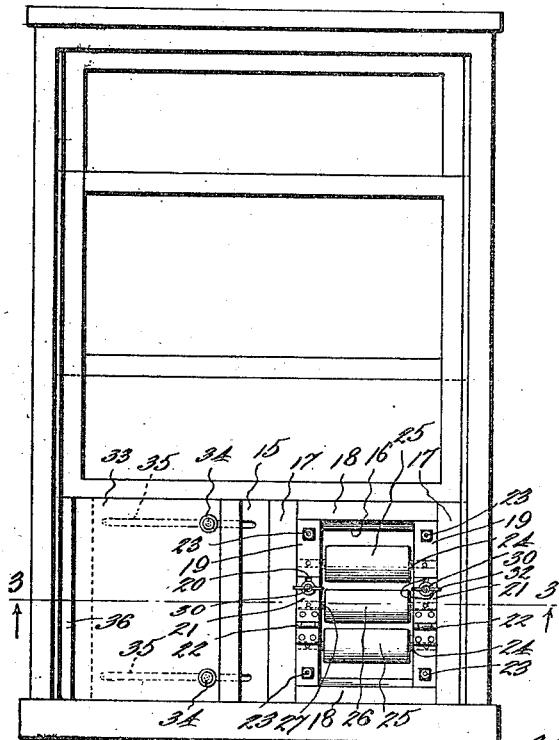
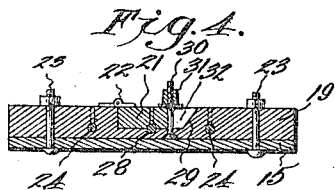
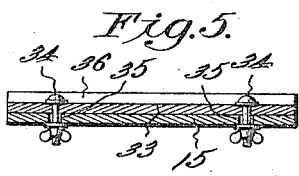
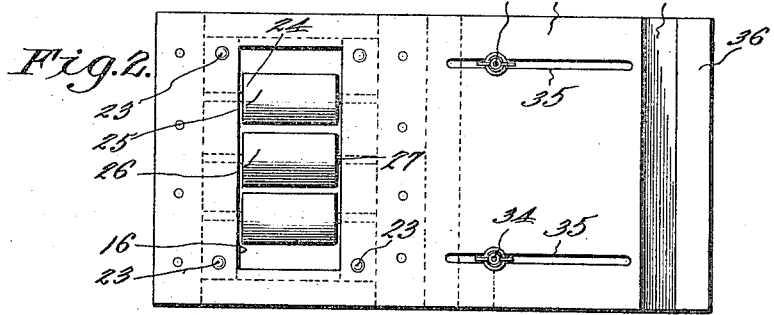
WITNESSES
INVENTOR
J. L. Coutts,
BY Victor J. Evans
ATTORNEY

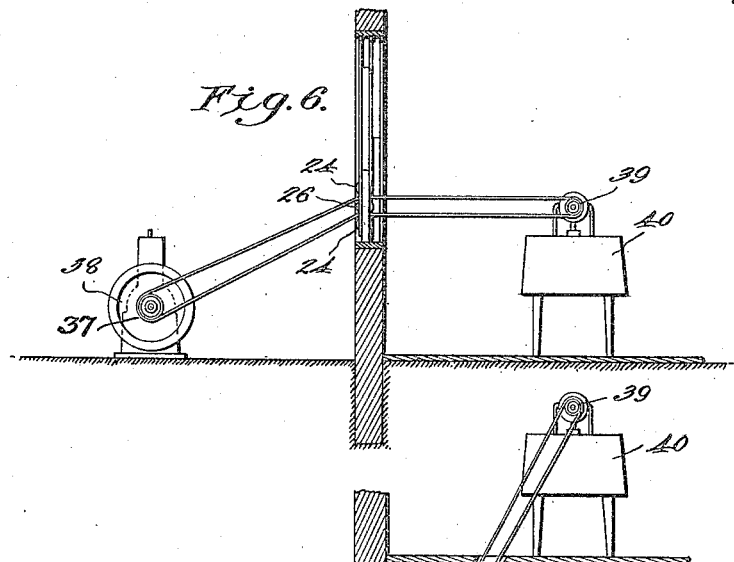
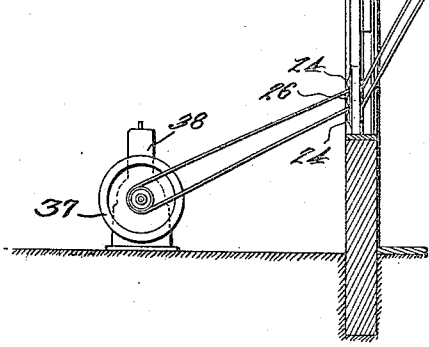
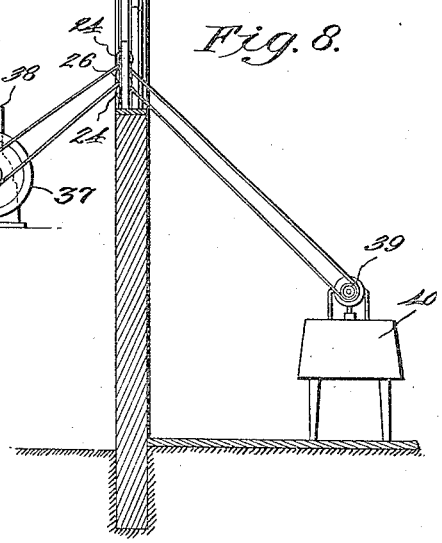

UNITED STATES PATENT OFFICE.

JOHN L. COUTTS, OF COLTON, SOUTH DAKOTA.

DEVICE FOR TRANSMITTING POWER.

1,282,678.

Specification of Letters Patent.

Patented Oct. 22, 1918.

Application filed September 21, 1917. Serial No. 192,524.

*To all whom it may concern:*

Be it known that I, JOHN L. COUTTS, a citizen of the United States, residing at Colton, in the county of Minnehaha and State of South Dakota, have invented new and useful Improvements in Devices for Transmitting Power, of which the following is a specification.

This invention relates to devices for the transmission of power and it has particular reference to a device adapted to be used in the transmission of power from an outdoor source to a machine or apparatus located within a house or building.

One object of the invention is to produce a simple and improved device which may be located or positioned in the frame of an ordinary window, the device embodying supported rollers over which a transmission belt may be guided.

A further object of the invention is to produce a device of this class which may be adjusted so as to fit window frames or casings of different sizes.

A further object of the invention is to produce a device of this class having a plurality of guide rollers one of which may be temporarily detached so as to permit the application of a transmission belt without unlacing such belt or separating the ends thereof.

A further object of the invention is to produce a device of the class described having a plurality of guide rollers over which a transmission belt may be guided for the purpose of transmitting power from a source located outdoors either above or below the machine or apparatus that is to be driven, thus enabling the device to be used for the purpose of transmitting power from a source located on the ground to a machine that is located upstairs or in the basement of a house or building.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a view in side elevation of a portion of a building having a window frame to which the invention has been applied.

Fig. 2 is a side elevation showing the opposite side of the invention detached from the window frame.

Fig. 3 is a sectional view taken on the line 3—3 in Fig. 1.

Fig. 4 is a sectional view taken on the line 4—4 in Fig. 3.

Fig. 5 is a vertical sectional view, showing the adjustable connection of the slide with the base.

Figs. 6, 7 and 8 are diagrammatic views showing different uses of the invention.

Corresponding parts in the several figures of the drawings are denoted by like characters of reference.

15 designates a base consisting of a rectangular board having near one end thereof a rectangular opening 16 which is surrounded by a frame structure consisting of side rails 17, and top and bottom rails 18. Adjacent to the inner faces of the side rails 17 are cleats 19 each having a recess 20 in the outer face thereof, said recesses being occupied by a block 21 which is connected with the body of the cleat by a hinge 22. The cleats 19 are preferably mounted on the base by means of bolts 23 and each of said cleats is provided with bearings intermediate the recess 20 and the ends of the cleats, said bearings being occupied by shafts 24 having rollers 25. These rollers may be known as the top and bottom rollers, and inasmuch as the device is capable of being inverted, either one of said rollers may be located at the top and the other at the bottom. A third roller 26 is carried by a shaft 27, bearings for said shaft being provided in the bottom faces of the recesses 20 and in the opposed faces of the blocks 21, said bearings being designated by 28. Each of the blocks 21 is beveled at the free end thereof, as indicated at 29, and the end walls of the recesses 20 opposed thereto are correspondingly beveled to enable the blocks 21 to swing open on their respective hinges. The blocks may be secured in closed position by means of bolts 30 having thumb nuts 31, and each block is preferably provided with a slot 32 at the end thereof to enable it to be swung open by merely removing the thumb nuts without detaching the bolt.

Mounted on the base member adjacent to one of the side rails 17 is a slide 33 which may be secured in adjusted position by means of bolts 34 for the reception of which the base member is provided with longitudinal slots 35. The slide 33 is provided at the outer end thereof with cleats 36 to produce a thickness equal to the combined thickness of the base member 15 and the cleats 17 at the opposite end of the frame. The improved device may be fitted to the frame of almost any ordinary window. In the drawing it has been shown fitted in the frame of an ordinary two sash window, the lower sash having been raised, after which the device is inserted beneath the same, and the slide 33 is moved outward until the frame is fitted between the guide beads of the window frame. The thumb nuts 31 are now clamped on the bolts 30, thus securing the device in position, the bottom sash being moved down until it contacts with the top edge of the base member 15. A transmission belt may now be placed in position by first manipulating the blocks 21 to permit the roller 26 to be detached, said roller 26 being interposed between the top and bottom leads of the transmission belt after which the roller is restored to its position. The transmission belt may now be passed over a pulley 37 driven by a motor 38, and also over a pulley 39 on a machine or device such as a washing machine or a churn conventionally indicated at 40. As will be seen by reference to Figs. 6, 7 and 8, such machine may be positioned on the ground floor of a building, the motor being substantially level therewith outside the building, or the machine to be driven may be located upstairs or downstairs at a materially higher or lower elevation than the motor, as seen in Figs. 7 and 8, respectively.

It will be seen that I have provided an extremely simple, inexpensive and easily operable device whereby a transmission belt may be guided for the purpose of transmitting motion from an outdoor source of power to a machine or apparatus that is located indoors, either upstairs or down, thus enabling a churn, washing machine, fan or any other device to be conveniently driven at little expense, thereby saving much hard labor, as well as time.

Having thus described the invention, what is claimed as new is:

1. A base or supporting member having an opening and a frame surrounding said opening, and a plurality of guide rollers supported for rotation within the opening, in combination with an extension slide mounted on the base or supporting member, whereby to vary the length of said supporting member.

2. A base or supporting member having an opening near one end thereof and an extension slide at the other end, cleats secured adjacent to the sides of the opening, each cleat having a recess intermediate the ends thereof, a hinged block occupying each of said recesses, the opposed faces of the blocks and the recesses affording bearings, a roller having a shaft supported detachably on said bearings, and additional rollers having shafts journaled in the cleats above and below the first mentioned roller.

3. A base or supporting member having an opening near one end thereof and an extension slide at the other end, cleats secured adjacent to the sides of the opening, each cleat having a recess intermediate the ends thereof, a hinged block occupying each of said recesses, the opposed faces of the blocks and the recesses affording bearings, a roller having a shaft supported detachably on said bearings, and additional rollers having shafts journaled in the cleats above and below the first mentioned roller, in combination with an extension slide mounted on the base.

In testimony whereof I affix my signature.

JOHN L. COUTTS.

Copies of this patent may be obtained for five cents each, by addressing the "Commissioner of Patents, Washington, D. C."